United States Patent [19]
Zenda

[11] Patent Number: 5,508,714
[45] Date of Patent: Apr. 16, 1996

[54] DISPLAY CONTROL APPARATUS FOR CONVERTING CRT RESOLUTION INTO PDP RESOLUTION BY HARDWARE

[75] Inventor: Hiroki Zenda, Hamura, Japan

[73] Assignee: Kabushiki Kaisha Toshiba, Kawasaki, Japan

[21] Appl. No.: 303,879

[22] Filed: Sep. 9, 1994

Related U.S. Application Data

[63] Continuation of Ser. No. 21,723, Feb. 25, 1993, abandoned, which is a continuation of Ser. No. 885,017, May 19, 1992, abandoned, which is a continuation of Ser. No. 406,615, Sep. 12, 1989, abandoned.

[30] Foreign Application Priority Data

Sep. 13, 1988 [JP] Japan .................. 63-229015

[51] Int. Cl.⁶ .................................................. G09G 5/00
[52] U.S. Cl. ................... 345/3; 345/1; 345/132
[58] Field of Search ........................ 345/3, 60, 87, 345/128, 129, 141, 143

[56] References Cited

U.S. PATENT DOCUMENTS

| | | | |
|---|---|---|---|
| 3,928,845 | 12/1975 | Clark | 340/731 |
| 4,121,283 | 10/1978 | Walker | 364/200 |
| 4,399,524 | 8/1983 | Muguruma et al. | 365/229 |
| 4,422,163 | 12/1983 | Oldenkamp | 365/229 |
| 4,430,649 | 2/1984 | Leininger | 340/731 |
| 4,454,593 | 6/1984 | Fleming et al. | 364/900 |
| 4,536,856 | 8/1985 | Hiroishi | 364/900 |
| 4,555,191 | 11/1985 | Gojo | 340/731 |
| 4,566,005 | 1/1986 | Apperley et al. | 340/771 |
| 4,574,279 | 3/1986 | Roberts . | |
| 4,586,156 | 4/1986 | Kurata et al. | 340/731 |
| 4,604,617 | 8/1986 | Morozumi | 340/805 |
| 4,611,203 | 9/1986 | Criscimagna et al. | 340/773 |
| 4,628,534 | 12/1986 | Marshall | 382/41 |
| 4,660,030 | 4/1987 | Maezawa | 340/805 |
| 4,679,038 | 7/1987 | Bantz et al. | 340/721 |
| 4,679,043 | 7/1987 | Morokawa | 340/805 |
| 4,712,140 | 12/1987 | Mintzer et al. | 340/731 |

(List continued on next page.)

FOREIGN PATENT DOCUMENTS

| | | |
|---|---|---|
| 0195203 | 9/1986 | European Pat. Off. . |
| 0244978 | 11/1987 | European Pat. Off. . |
| 0326275 | 8/1989 | European Pat. Off. . |
| 3718078 | 12/1987 | Germany . |
| 2053533 | 2/1981 | United Kingdom . |

OTHER PUBLICATIONS

Operation Manual–EGAWONDER, Jan. 1987.
Advertisement–EGAWONDER, PC Magazine, vol. 6 No. 3, Feb. 1987.
IBM Enhanced Graphics Adapter–IBM Enhanced Graphics–(Aug. 2, 1984).
PEGA 2 User's Guide, 50208, Rev. 4, 1986, Paradise Systems, Inc., pp. 10–16 and 50.
Patent Abstracts of Japan, vol. 7, No. 234 (P–230) Oct. 18, 1983 & JP–A–58 123 118 (Fujitsu K.K.) Jul. 22, 1983.

*Primary Examiner*—Ulysses Weldon
*Assistant Examiner*—Matthew Luu
*Attorney, Agent, or Firm*—Finnegan, Henderson, Farabow, Garrett & Dunner

[57] ABSTRACT

In a personal computer system which is equipped with a plasma display unit as a standard I/O device having a horizontal resolution of 640 dots and which can arbitrarily be connected to a CRT display unit having a horizontal resolution of 720 dots, a high-resolution display system includes a display timing data register suitable for the horizontal resolution of the CRT display unit. The display timing data stored in the display timing register is converted into display timing data having a horizontal resolution of 640 dots by a display timing converter. The converted timing data is stored in a clock management register, a clock mode register, and a horizontal panning register in a CRT controller. The high-resolution display system includes a circuit responsive to read access of the respective registers for transferring to a CPU the display timing data which has a horizontal resolution of 720 dots and which is stored in the display timing data register.

12 Claims, 10 Drawing Sheets

U.S. PATENT DOCUMENTS

| | | | |
|---|---|---|---|
| 4,730,186 | 3/1988 | Koga et al. | 340/716 |
| 4,751,502 | 6/1988 | Ishii et al. | 340/709 |
| 4,760,387 | 7/1988 | Ishii et al. | 340/716 |
| 4,763,279 | 8/1988 | Kellam et al. | 364/518 |
| 4,764,975 | 8/1988 | Inoue | 382/47 |
| 4,769,852 | 9/1988 | Hashimoto et al. | 382/45 |
| 4,847,788 | 7/1989 | Shimada | 364/522 |
| 4,855,728 | 8/1989 | Mano et al. | 340/805 |
| 4,881,069 | 11/1989 | Kameda et al. | 340/731 |
| 4,926,166 | 5/1990 | Fujisawa et al. | 340/717 |

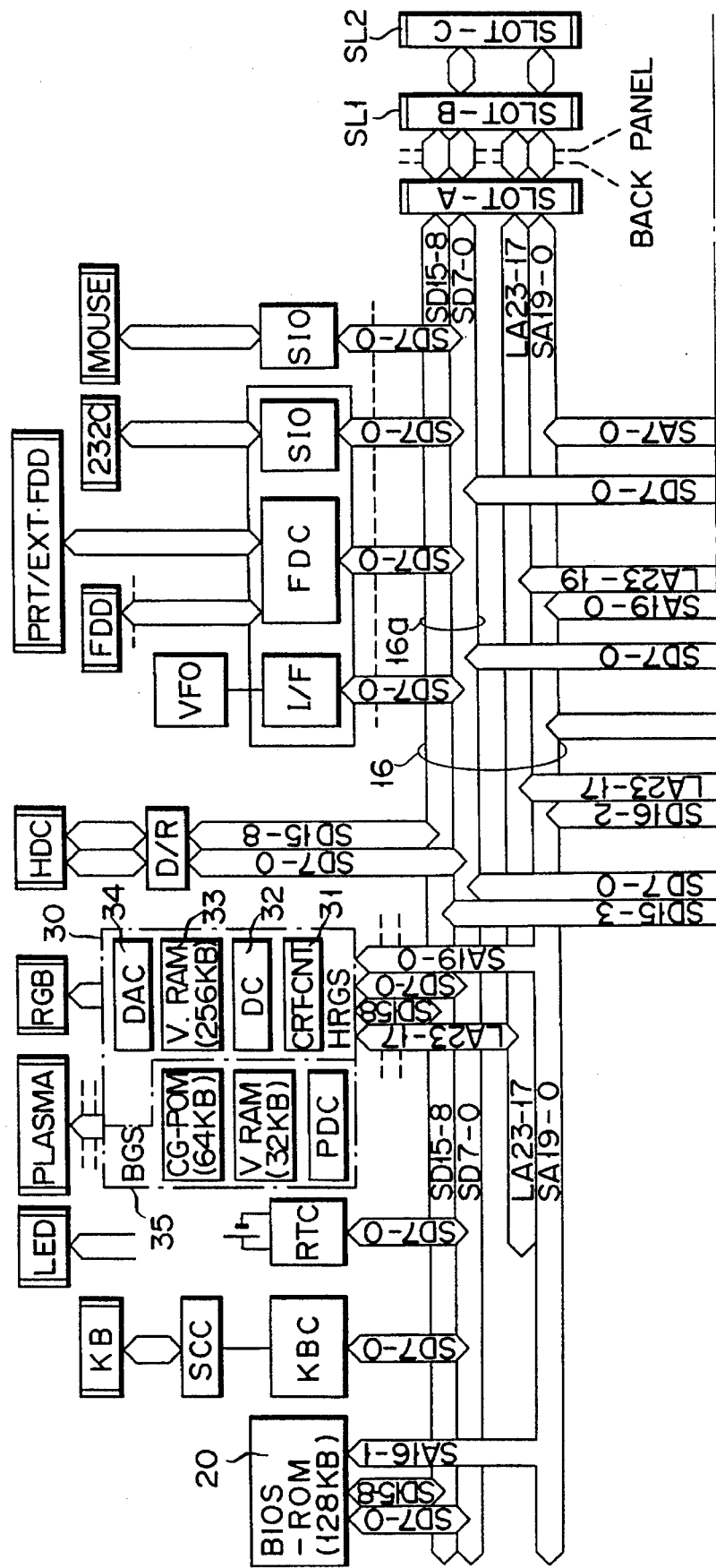
F I G. 1A

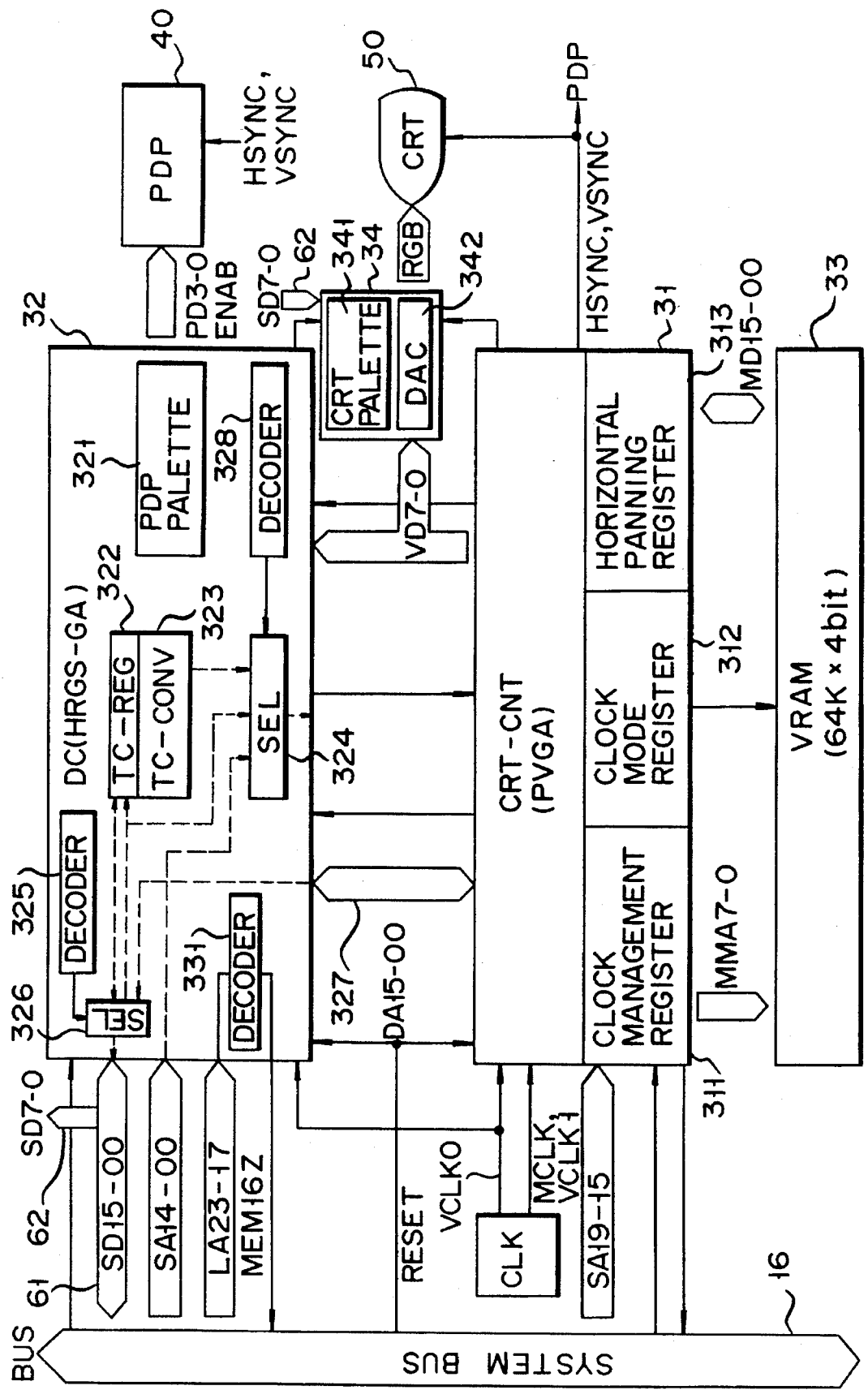
F I G. 2

| BIT 3 | BIT 2 | FUNCTION |
|---|---|---|
| 0 | 0 | 25.175MHz (BASIC CLOCK FOR HORIZONTAL RESOLUTION: 640 DOTS |
| 0 | 1 | 28.322MHz (BASIC CLOCK FOR HORIZONTAL RESOLUTION: 720 DOTS |
| 1 | 0 | RESERVED |
| 1 | 1 | RESERVED |

| BIT 0 | FUNCTION |
|---|---|
| 0 | 1 CHARACTER CLOCK = 9 DOTS |
| 1 | 1 CHARACTER CLOCK = 8 DOTS |

| BIT3 | BIT2 | BIT1 | BIT0 | WIDTH TO BE SHIFTED LEFT | | |
|---|---|---|---|---|---|---|
| | | | | MODE 0+,1+,2+, 3+,7,7+ | MODE 13 | OTHER MODE |
| 0 | 0 | 0 | 0 | 1 | 0 | 0 |
| 0 | 0 | 0 | 1 | 2 | 1 | 1 |
| 0 | 0 | 1 | 0 | 3 | 1 | 2 |
| 0 | 0 | 1 | 1 | 4 | 1 | 3 |
| 0 | 1 | 0 | 0 | 5 | 2 | 4 |
| 0 | 1 | 0 | 1 | 6 | 1 | 5 |
| 0 | 1 | 1 | 0 | 7 | 3 | 6 |
| 0 | 1 | 1 | 1 | 8 | 1 | 7 |
| 1 | 0 | 0 | 0 | 0 | 1 | 1 |

FIG. 9

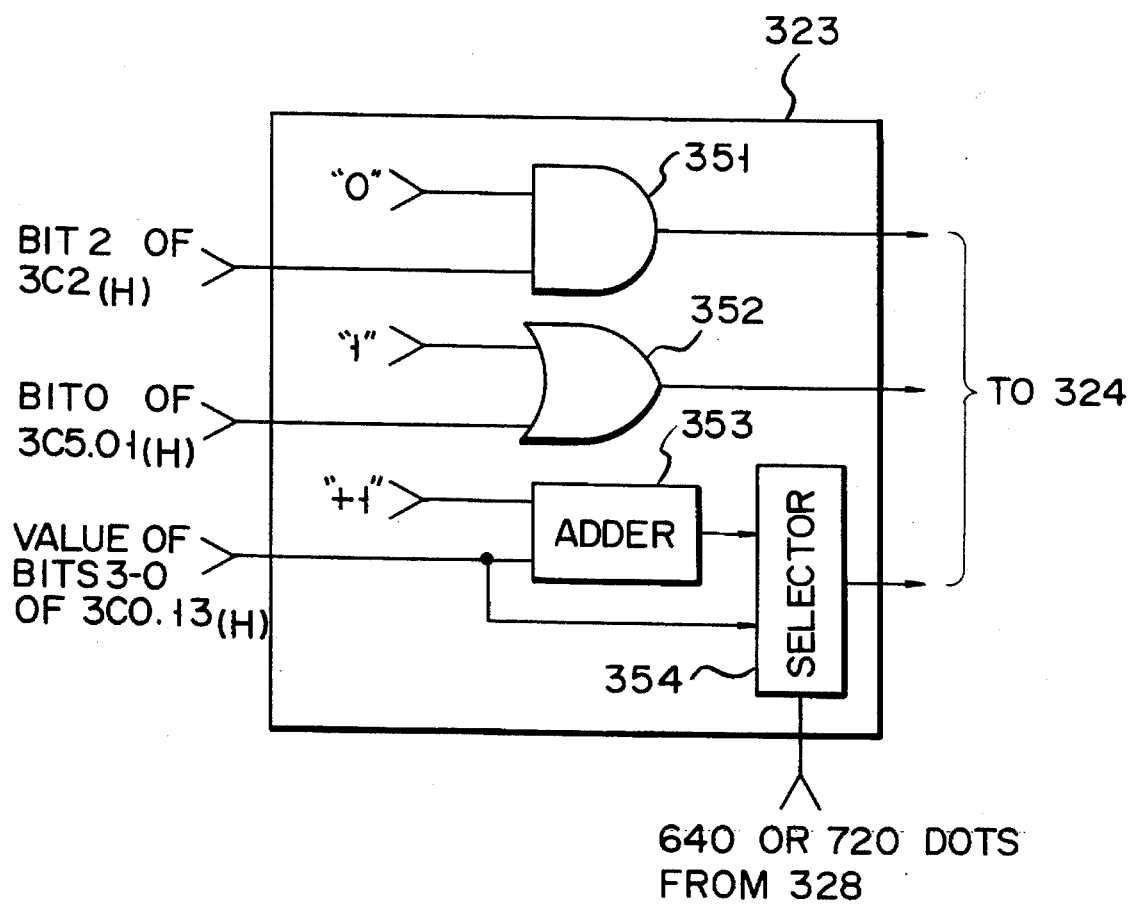
F I G. 10

1

DISPLAY CONTROL APPARATUS FOR CONVERTING CRT RESOLUTION INTO PDP RESOLUTION BY HARDWARE

This application is a continuation of application Ser. No. 08/021,723, filed Feb. 25, 1993, which is a continuation of application Ser. No. 07/885,017 filed May 19, 1992, which is a continuation of application Ser. No. 07/406,615 filed Sep. 12, 1989, all now abandoned.

BACKGROUND OF THE INVENTION

1. Field of the Invention

The present invention relates to a display control apparatus which includes a flat panel display unit (FPD) such as a plasma display unit as a standard I/O device and can be arbitrarily connected to a CRT display unit, and can be suitable for use in a computer system such as a personal computer and a personal workstation.

2. Description of the Related Art

Liquid crystal displays and plasma displays have been used as display units for conventional lap-top type personal computers and personal workstations. However, strong demand has arisen for running an application program created for a Cathode Ray Tube (CRT) display unit in the above computer so as to utilize a wealth of all previous software. For this reason, the above computer equipped with a plasma display unit as a standard Input/Output (I/O) device is arranged to be connectable to a CRT display unit as an optional I/O device.

The plasma and CRT display units, however, have different display timing data. For example, the CRT display unit has a horizontal resolution of 720 dots (standard text display), while the plasma display unit has a horizontal resolution of 640 dots. It is impossible for the plasma display unit to use and execute a basic input and output system program (BIOS) for CRT display units and application programs without modifications.

For this reason, a conventional computer system cannot simultaneously operate CRT and plasma display units (this mode of operation is hereinafter referred to as a dual display mode) by using a CRT display unit application program.

SUMMARY OF THE INVENTION

It is an object of the present invention to provide a display control apparatus capable of simultaneously operating CRT and flat panel display units.

It is another object of the present invention to provide a display control apparatus capable of automatically generating flat panel display timing data from CRT display timing data without modifying a CRT display unit BIOS to simultaneously operate CRT and flat panel display units using a CRT application program.

According to a first-aspect of the present invention, there is provided a display control apparatus for outputting display timing data having a resolution of a flat panel display unit, such as a plasma display unit, on the basis of display timing data having a resolution of a CRT display unit in a system which includes the plasma display unit as a standard I/O device and which can be arbitrarily connected to the CRT display unit having a resolution different from that of the plasma display unit, comprising: display timing data generating means for generating the display timing data having the resolution of the plasma display unit from the display timing data having the resolution of the CRT display unit; and means for driving the CRT and plasma display units on the basis of the display timing data generated by the display timing data generating means.

According to a second aspect of the present invention, there is provided a display control apparatus in a system having a plasma display unit, comprising: means for receiving the CRT display unit display timing data and outputting the plasma display timing data; and means for outputting the CRT display unit timing data in response to a read request for the display timing data.

According to a third aspect of the present invention, there is provided a display control apparatus in a system having a plasma display unit, comprising: means for receiving the CRT display unit timing data and outputting the plasma display unit timing data; and means for driving the plasma display unit on the basis of the output plasma display unit timing data.

According to the present invention, CRT application software can be executed with the plasma display unit, without modifying a CRT BIOS and CRT application software. Since the plasma display unit has a horizontal resolution of 640 dots, a display period of the 9th dot in the horizontal direction of a CRT 9×16 dot font (box size of 9×16 dots/character) is omitted to compress the font size into a size of 8×16 dots so as to drive the plasma display unit at a horizontal resolution of 640 dots. The compressed font is displayed on both the CRT and plasma display units.

Furthermore, according to the present invention, since the dual display mode is achieved without modifying the CRT BIOS and CRT application software, it is assumed on the CPU side that the CRT unit is driven at a horizontal resolution of 720 dots. Contents of a clock management register, a clock mode register, and a horizontal panning register, all of which are arranged in a CRT controller, can be read out. Therefore, there is provided a register for returning the control data for the horizontal resolution of 720 dots upon read access of these registers under the control of the CPU.

BRIEF DESCRIPTION OF THE DRAWINGS

FIGS. 1A and 1B form a block diagram showing an overall arrangement of a computer system which employs the present invention;

FIG. 2 is a detailed block diagram showing a display control apparatus shown in FIG. 1;

FIG. 9 is a view for explaining values and functions of bit 3 through bit 0 of the horizontal panning register;

FIG. 10 is a block diagram showing a detailed arrangement of a timing converter 323 shown in FIG. 2;

DETAILED DESCRIPTION OF THE PREFERRED EMBODIMENT

Figure 1B:
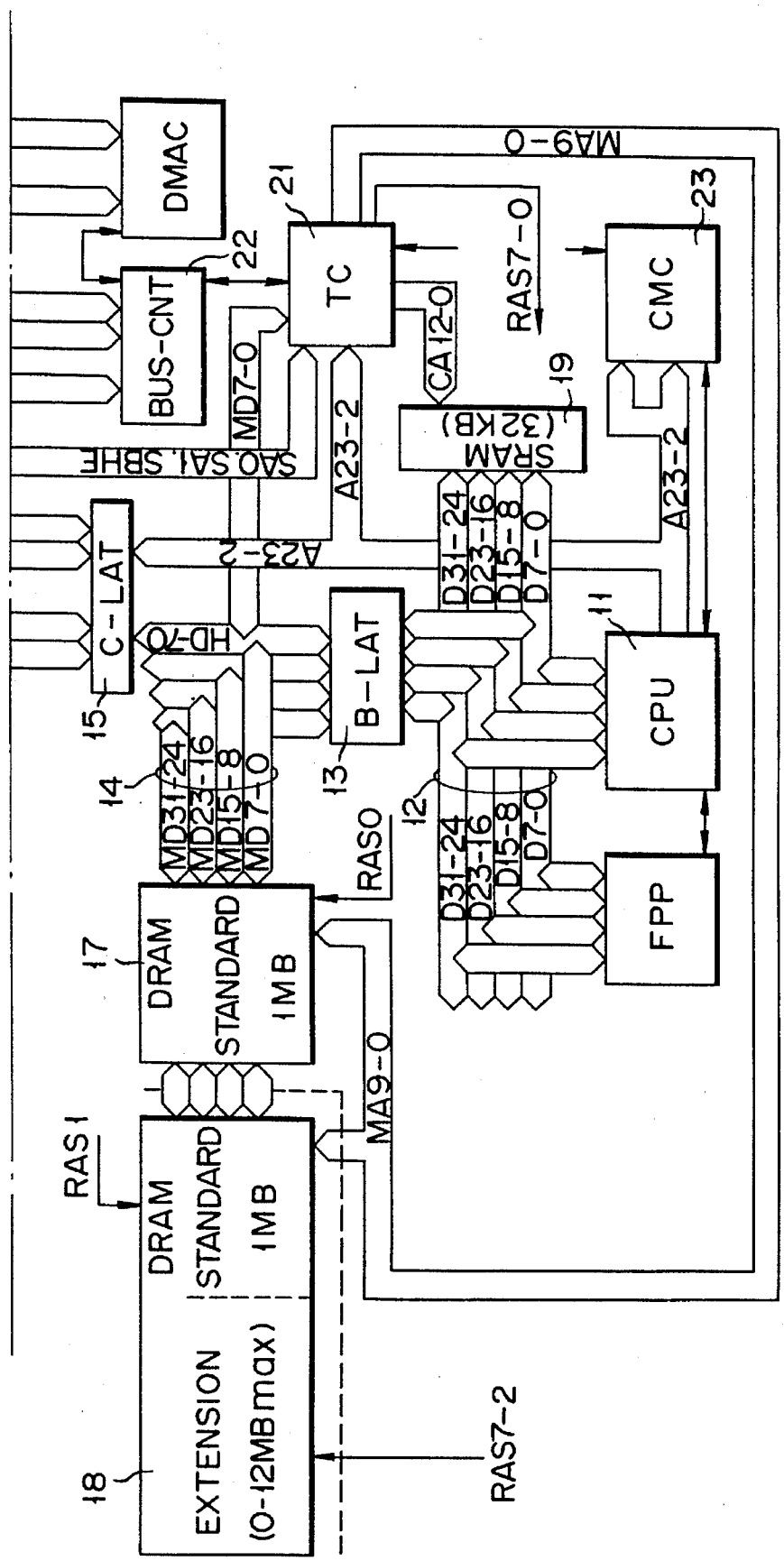

FIGS. 1A and 1B show a block diagram showing an overall arrangement of, e.g., a lap-top type personal computer. Referring to FIG. 1B, an element 11 is a central processing unit (CPU) for controlling the overall system. An element 12 is a 32-bit data bus (D31 - D24, D23 - D16, D15 - D8, D7 - D0). An element 13 is a latch circuit (B-LAT) for latching data on the data bus 12. An element 14 is a 32-bit memory bus (MD31 - MD24, MD23 - MD16, MD15 - MD8, MD7 - MD0). An element 16 of FIG. 1A is a system bus consisting of 16- and 7-bit address buses (SA19 - SA0, LA23 - LA17) and a 16-bit data bus (SD15 - SD8, SD7 - SD0) 16a. Referring again to FIG. 1B, the element 15 is a latch circuit (C-LAT) for latching address data on the address bus (SA19 - SA0, LA23 - LA17) and data on the data bus (SD15 - SD8, SD7 - SD0) 16a. Elements 17 and 18 comprise internal dynamic random access memories (DRAMs), respectively, backed-up with batteries (not shown). An element 19 (FIG. 1B) is a cache memory, and an element 20 (FIG. 1A) is an internal ROM (BIOS-ROM) for storing a basic input and output system program. The BIOS-ROM 20 stores and designates CRT display timing data set by a CRT controller (CRT-CNT) 31 to be described later.

Referring again to FIG. 1B, the element 21 is a timing controller (TC) for performing timing control of the overall system including memory control. An element 22 is a bus controller (BUS-CNT) for controlling the system bus 16. An element 23 is a cache memory controller (CMC) for controlling the cache memory 19.

The element 30 of FIG. 1A is a high-resolution display (or graphics) system (HRGS) having a display control function for driving an optional CRT display at a high resolution (720 dots in the horizontal direction) with multilevel gradation (64 gray scale levels) and a display control function for simultaneously driving CRT and flat panel display units, e.g., plasma display units (in this case), both having a horizontal display resolution of 640 dots. The HRGS 30 can be arbitrarily connected to the display control apparatus. A CRT display unit can be arbitrarily connected to the HRGS 30 through a connector C1 (not shown in FIGS. 1A and 1B). An element 35 is the display system (BGS) for driving a plasma display unit (plasma or PDP). The plasma display PDP is connected to the BGS 35 through a connector C2 (not shown in FIGS. 1A and 1B). Note that the plasma display unit is a standard I/O device and is kept connected to the connector C2.

Elements SL1 and SL2 are extended slots (SLOT-B and SLOT-C) capable of connecting various types of extended boards including a display adapter board.

FIG. 2 is a block diagram showing a detailed arrangement of the HRGS 30 shown in FIG. 1A. An element 31 is a CRT display controller (CRT-CNT) for driving a CRT display unit 50 at the high resolution (720 dots). The CRT controller 31 described above may adopt PVGA1 available from Paradise, U.S.A. The CRT-CNT 31 includes a clock management register 311, a clock mode register 312, and a horizontal panning register 313. These registers 311, 312, and 313 are used to manage CRT display timings.

Figures 3, 4:
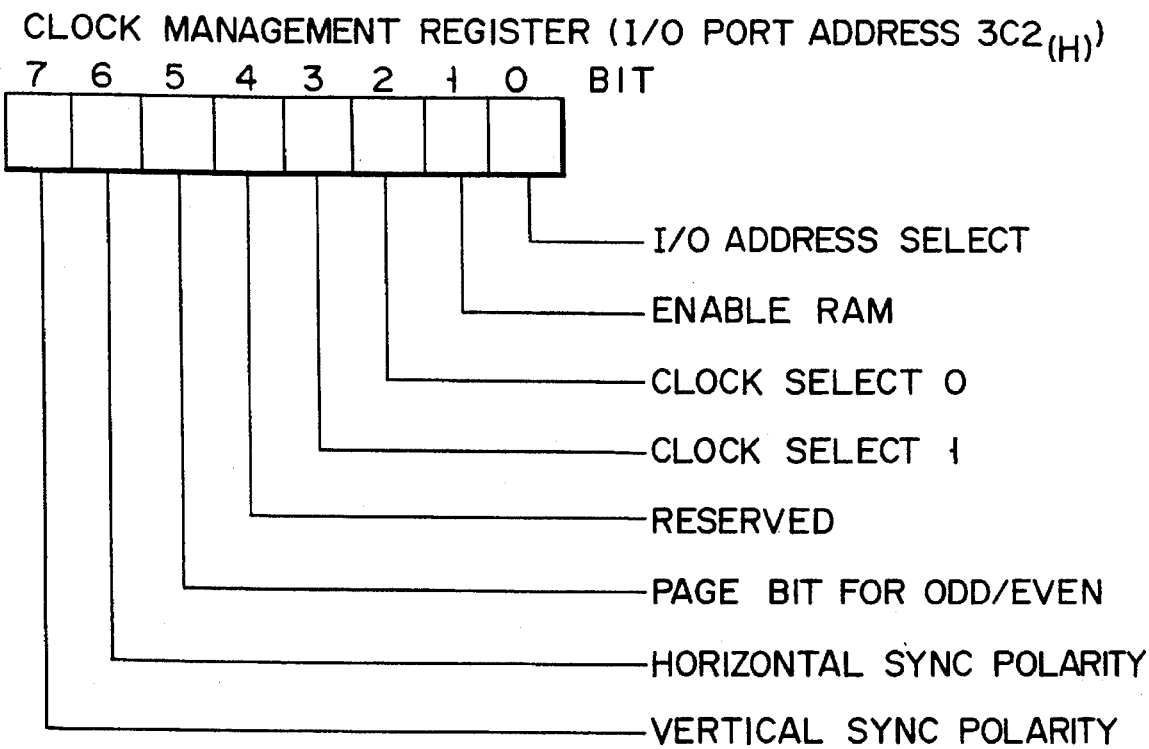
FIG. 3 is a view showing bit assignment of a clock management register in a CRT controller 31 shown in FIG. 2.
FIG. 4 is a view showing bit patterns and functions of bits 2 and 3 of the clock management register shown in FIG. 3.

The clock management register 311 (I/O port address: 3C2(H)) is used to select a basic clock (25.175 MHz) for a horizontal resolution of 640 dots or a basic clock (28.322 MHz) for a horizontal resolution of 720 dots. That is, the clock management register 311 is arranged, as shown in FIG. 3. As shown in FIG. 3, an "I/O address select" is assigned to bit 0; "Enable RAM", bit 1; "clock select 0" and "clock select 1", which are directly associated with the present invention, bits 2 and 3, respectively; "page bit for odd/even", bit 5; "horizontal sync polarity", bit 6; and "vertical sync polarity", bit 7.

The "I/O address select" is a bit for determining a port address of a register mapped into the CRT controller 31. The address of the CRT controller 31 and the address of the input status register are determined such that if this bit is set at logic "0", this corresponds to monochromatic emulation; however, if the bit is set at logic "1", it corresponds to color emulation.

The "Enable RAM" is information for inhibiting the CPU 11 to access a VRAM 33 (FIG. 2) when bit 1 is set at logic "0". Otherwise, the CPU 11 can access the VRAM 33.

Bits 2 and 3 represent information for selecting the basic clocks associated with the present invention. As shown in FIG. 4, when bit 2 is set at logic "0", the basic clock (25.175 MHz) for the horizontal resolution of 640 dots is selected. When bit 2 is set at logic "1", the basic lock (28.322 MHz) for the horizontal resolution of 720 dots is selected.

According to this embodiment of the present invention, in the dual display mode, bit 2 of the clock management register (3C2(H)) is set at logic "0" to set the horizontal resolution of the CRT display unit to be 640 dots, which resolution is equal to that of the plasma display unit.

Bit 5 represents information for selecting one of two 64-kB page memories in the odd/even mode. Bit 6 represents information for determining the positive or negative polarity of a horizontal sync signal. Bit 7 represents information for determining the positive or negative polarity of a vertical sync signal. Information of bits 0, 1 and 4 through 7 is not directly associated with the present invention, and a detailed description thereof will be omitted.

Figures 5, 6:
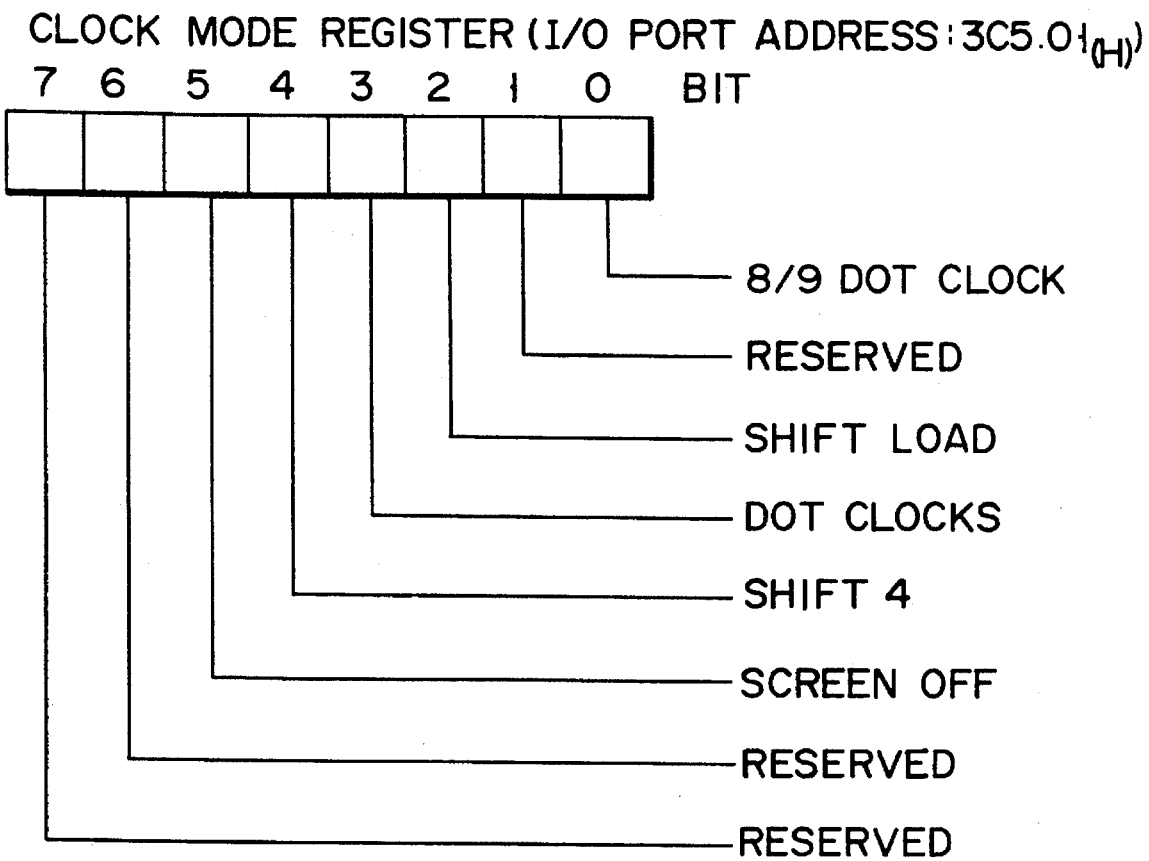
FIG. 5 is a view showing bit assignment of a clock mode register in the CRT controller 31 shown in FIG. 2.
FIG. 6 is a view showing contents and functions of bit 0 of the clock mode register shown in FIG. 5.

The clock mode register 312 (I/O port address: 3C5.01(H)) is a register representing a dot count (9 dots/8 dots) or size of one character. Each bit assignment is shown in FIG. 5. As shown in FIG. 5, information "8/9 dot clock" is assigned to bit 0 directly associated with the present invention; "shift load", bit 2; "dot clocks", bit 3; "shift 4", bit 4; and "screen off", bit 5. The remaining bits are "reserved" bits. That is, bit 0 is a bit for determining a dot count of a character clock. As shown in FIG. 6, if bit 0 is set at logic "0", each character clock has a 9-dot width. If bit 0 is set at logic "1", one character clock has an 8-dot width.

According to this embodiment, in the dual display mode, in order to equal the horizontal resolution of the CRT display unit with that of the plasma display unit (640 dots), bit 0 of the clock mode register (3C5.01(H)) is set at logic "1" (8 (dots)×80 (characters)= 640 (dots) for 80 characters per line). Information "shift load" represents data load. That is, when bit 0 is set at logic "0" and bit 4 (shift 4) is set at logic "0", data is loaded every character clock and is sent to the shift register. When bit 2 is set at logic "1" and bit 4 is set at logic "0", data is loaded in units of two character clocks, and data is then sent to the shift registers in units of 16 bits. When bit 3 is set at logic "0", the clock input to the control chip serves as a dot clock. When bit 3 is set at logic "1", the clock input to the control chip is frequency-divided into ½ clocks each of which serves as a dot clock.

When bit 4 is set at logic "0", data is loaded every character or in units of one or two characters and is sent to the shift register. When bit 4 is set at logic "1", the data is loaded in units of four character clocks and is sent to the shift registers in units of 32 bits. When bit 5 is set at logic "1", the display becomes OFF, and the system processor can always access the VRAM. In order to perform a normal display, bit 5 is set at logic "0". Note that bit 5 of logic "1" allows normal transfer of horizontal/vertical sync signals to the CRT. By using this bit, the screen updating can be quickly performed. Bit 1 through bit 7 of the clock mode register are not directly associated with the present invention, and a detailed description thereof will be omitted.

Figure 7:
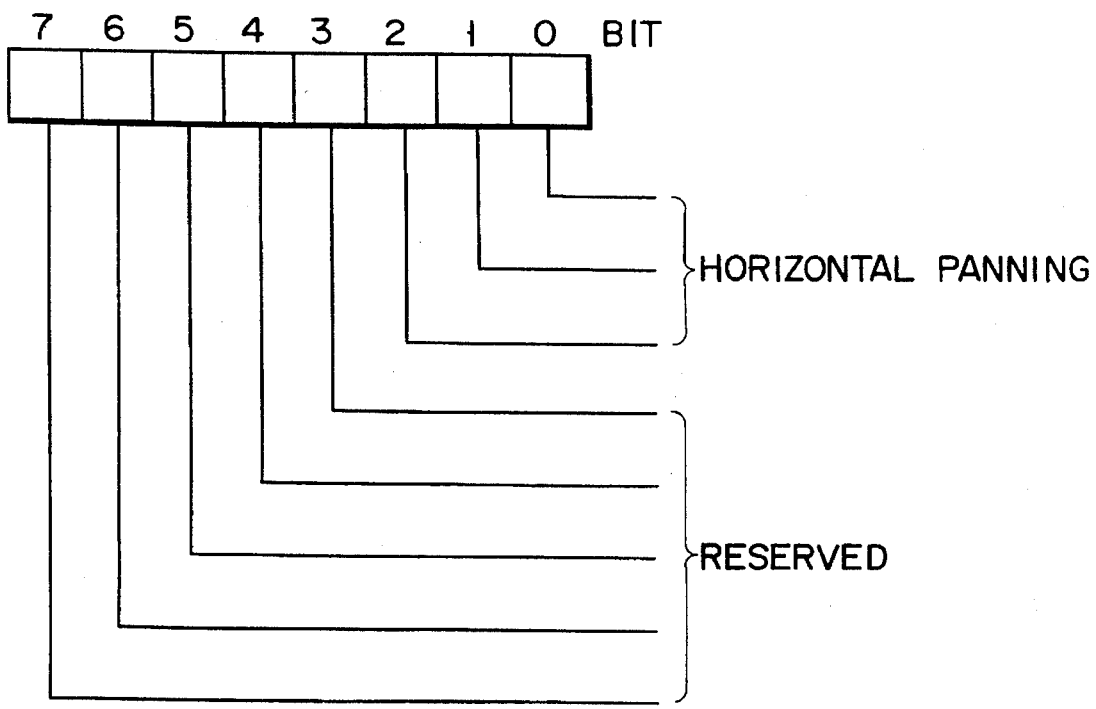
FIG. 7 is a view showing bit assignment of a horizontal panning register in the CRT controller 31 shown in FIG. 2.
Figure 8:
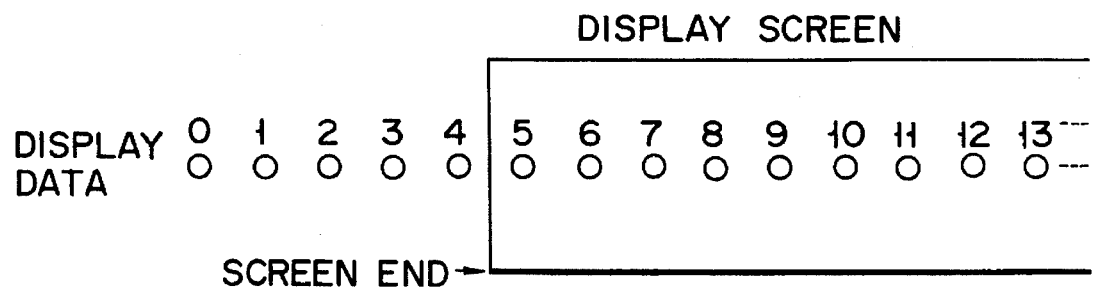
FIG. 8 is a view for explaining a horizontal shift width of dots.

The horizontal panning register 313 (I/O port address: 3C0.13(H)) is a register for managing a horizontal scroll dot count within one character. Each bit assignment is shown in FIG. 7. The dot unit panning designation display in the horizontal direction can be shifted to the left by a maximum of one character width in accordance with a value set in the horizontal panning register. For example, when a shift width count is "5", the content is shifted by 5 dots and displayed from the 6th dot from the left, as shown in FIG. 8. A relationship between the shift width and the values set in bit 0 through bit 3 of the horizontal panning register is shown in FIG. 9. The number of PELs (pixels) for shifting the video data to the left in the horizontal direction is selected. Pel panning can be used in both text and graphics modes. A maximum of 8 pixels can be shifted in the monochromatic emulation text mode (mode 7 and mode 7+) and modes 0+, 1+, 2+, and 3+. A maximum of three pixels can be shifted in a 256-color graphics mode (mode 13h). A maximum of 7 pixels can be shifted in other text and graphics modes. When the start address in the CRT-CNT 31 is switched, panning in a wide range can be performed. A relationship between the register setup values and the shift widths is shown in FIG. 9. In the dual display mode, even if the value for bit 3 through bit 0 is set to be 7 in the modes 0+, 1+, 2+, 3+, 7, and 7+, a shift width count becomes 7. The same functions as those defined by the interface are set in other modes.

Values can be set in the registers 311, 312, and 313 by a display timing converter 323 in a display controller 32.

The display controller 32 is a display controller (DC) of a gate-array structure which has a bus interface function for exchanging display control data with the CPU 11 and various functional circuits for controlling display of the plasma display unit (PDP).

The display controller 32 includes: a PDP palette 321 used for gradation display of a plasma display unit 40; a display timing data register 322 for storing CRT display timing data of the horizontal resolution of 720 dots, i.e., CRT timing data (display timing data to be set in the clock management register 311, the clock mode register 312, and the horizontal panning register 313) supplied from the BIOS-ROM 20 in the dual display mode; and the display timing converter 323 for converting the display timing data of the display timing data register 322 into display timing data of the horizontal resolution of 640 dots and for setting the converted data in the clock management register 311, the clock mode register 312, and the horizontal direction panning register 313 in the CRT controller 31 in the dual display mode.

The display timing data register 322 receives the CRT display timing data of the resolution of 720 dots from the CPU 11 through a data bus 61. This timing data is pre-stored in the BIOS-ROM 20. The clock management register 311, the clock mode register 312, and the horizontal panning register 313 are arranged to be accessed by the CPU 11. Therefore, a selector 326 is arranged in the display controller 32. The selector 326 receives the contents of the clock management register 311, the clock mode register 312, and the horizontal panning register 313 through a multibus 327 and also receives the content of the display timing data register 322. When the I/O port address is set to be "3C2(H)", "3C5.1(H)", and "3C0.13(H)", a decoder 325 supplies selection information to the selector 326 and supplies the content of the display timing data register 322 to the CPU 11. When the I/O port address represents any other value, the decoder 325 supplies data from the multibus 327 to the CPU 11.

A decoder 328 determines a CRT or dual display mode. When the CRT display mode is set, the decoder 328 controls a selector 324 such that the CRT display timing data having a resolution of 720 dots is set in the clock management register 311, the clock mode register 312, and the horizontal panning register 313 in the CRT-CNT 31. When the decoder 328 determines a dual display mode, it controls the selector 324 such that the CRT and PDP display timing data having a resolution of 640 dots is set in the clock management register 311, the clock mode register 312, and the horizontal panning register 313.

A decoder 331 decodes data of bit 23 through bit 17 of the address and outputs a MEM 16 Z signal onto the system bus 16. This operation is not directly associated with the present invention, and a detailed description thereof will be omitted.

The display timing converter 323 is a circuit for converting the display timing data (horizontal resolution: 720 dots) for the CRT display unit 50 which is stored in the display timing data register 322 into CRT and plasma display timing data (horizontal resolution: 640 dots).

A detailed arrangement of the display timing converter 323 is shown in FIG. 10. The display timing converter 323 shown in FIG. 10 comprises an AND gate 351, an OR gate 352, an adder 353, and a selector 354.

Bit 2 of the clock management register (3C2(H)) is supplied to one input terminal of the AND gate 351, and data of "0" is supplied to the other input terminal of the AND gate 351. Bit 0 of the clock mode register (3C5.01(H)) is supplied to one input terminal of the OR gate 352, and data of "1" is supplied to the other input terminal of the OR gate 352. A value represented by bits 3 through 0 of the horizontal panning register (3C0.13(H)) is supplied to one input terminal of the adder 353, and data of "+1" is supplied to the other input terminal of the adder 353.

The AND gate 351 outputs data in which bit 2 of 3C3(H) is always set to logic "0", and the OR gate 352 outputs data in which bit 0 of 3C5.01(H) is always set to logic "1". The adder 353 increments the value represented by bits 3 through 0 of 3C0.13(H) by one. An output from the adder 353 is supplied to the selector 354. The selector 354 selects an output from the adder 353 when the horizontal resolution is 720 dots. However, when the horizontal resolution is 640 dots, the selector 354 gates the value represented by bits 3 through 0 of 3C0.13(H) therethrough.

The display timing data whose horizontal resolution is converted from 720 dots to 640 dots is supplied to the clock management register 311, the clock mode register 312, and the horizontal panning register 313 in the CRT-CNT 31 through the multibus 327.

Display timing data except for the horizontal resolutions are not converted and are used as PDP display timing data. In this embodiment, a plasma display unit operated at the same timings as those of the CRT display unit is used as the plasma display unit 40. Details of such a plasma display unit are described in "Plasma Display Control System" (U.S. Ser. No. 355,615) filed on May 23, 1989.

If pairs of registers and converters are provided for other display timing data except for the above horizontal resolution conversion using the register 322 and the converter 232, the CRT and PDP display units can be simultaneously driven without modifying the CRT BIOS.

In the above embodiment, the display controller 32 comprises one chip of highly integrated semiconductor elements.

The display data memory (to be referred to as a VRAM hereinafter) 33 in FIG. 2 has a capacity of 64×4 bits and stores display data. A CRT display data generator 34 generates analog display data under the control of the CRT display controller 31. The CRT display data generator 34 comprises a CRT palette 341 and a digital-to-analog (A/D) converter 342. The 16-bit data bus (SD15 - SD0) transfers various data including updating palette data between the system bus 16 and the display controller 32. A data bus 62 is a data bus (SD7 - SD0) for writing the palette data into the CRT palette 341 in the CRT display data generator 34.

An operation of this embodiment will be described below.

In the dual display mode, when an application program for the CRT display unit 50 is started, the CRT display timing data (i.e., the values set in the clock management register 311, the clock mode register 312, and the horizontal panning register 313) having a resolution of 720 dots is read out from the BIOS-ROM 20 under the control of the CPU 11. The readout data is set in the display timing data register 322 through the system bus 16, the data bus 61, and the selector 326. When the horizontal resolution is 640 dots, the display timing converter 323 sets bit 2 of the display timing data set in the clock management register 311 to "0" so that the basic clock (25.175 MHz) is output. In addition, the display timing converter 323 sets bit 0 of the clock mode register 312 to logic "1" so that one character clock corresponds to eight dots. Furthermore, the display timing converter 323 adds "1" to values 0, 1, 2, 3, 4, 5, 6, 7, and 8 of bits 3 through 0 of the horizontal panning register 313 so that the shift widths become 1, 2, 3, 4, 5, 6, 7, 8, 0, as shown in FIG. 9. The display timing converter 323 stores these values in the registers 311, 312, and 313 in the CRT-CNT 31 through the selector 324 and the multibus (a composite bus of the data and address buses) 327. The CRT-CNT 31 sets the CRT palette data and the PDP palette data in the CRT palette 341 and the PDP palette 321 on the basis of the display timing data set in the clock management register 311, the clock mode register 312, and the horizontal panning register 313. An operation upon palette data setup is not directly associated with the present invention. Please refer to palette data setup in copending U.S. Ser. No. 208,044 filed Jun. 17, 1988 by the present applicant for further details.

Figure 11:
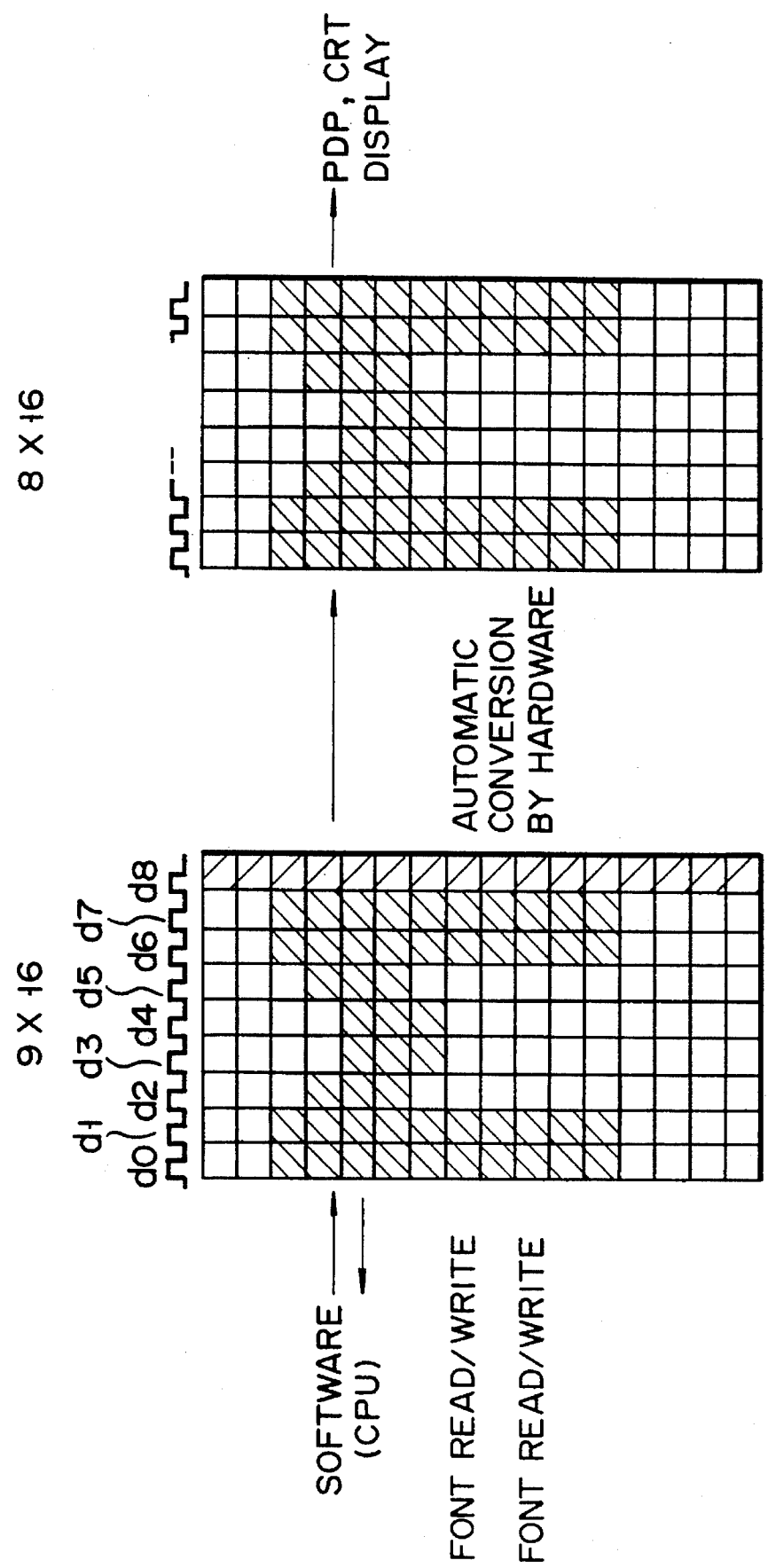
FIG. 11 is a view for explaining font conversion when the horizontal resolution is converted from 720 dots to 640 dots.

As described above, since the CRT display unit display timing data having a horizontal resolution of 720 dots is converted into 640-dot display timing data by hardware, a font having a 9×16 dot format for CRT display (i.e., a box size of 9×16 dots/character) can be compressed into a font size of 8×16 dots. The compressed font can be displayed on the plasma and CRT display units 40 and 50. In the dual display mode, data is written in the form of 9×16 dots on the CPU 11 side, and this data is converted into a font of 8×16 dots by hardware. This is illustrated in FIG. 11.

When the CPU 11 performs read access of the clock management register 311, the clock mode register 312, and the horizontal panning register 313, the read access is detected by the decoder 325, and the selector 326 is controlled such that the display data held in the display timing data register 322 is transferred to the CPU 11.

In the CRT display mode, this mode is detected by the decoder 328. The display timing data having the horizontal resolution of 720 dots and sent from the BIOS-ROM 20 is selected and set in the clock management register 311, the clock mode register 312, and the horizontal panning register 313.

Figure 12:
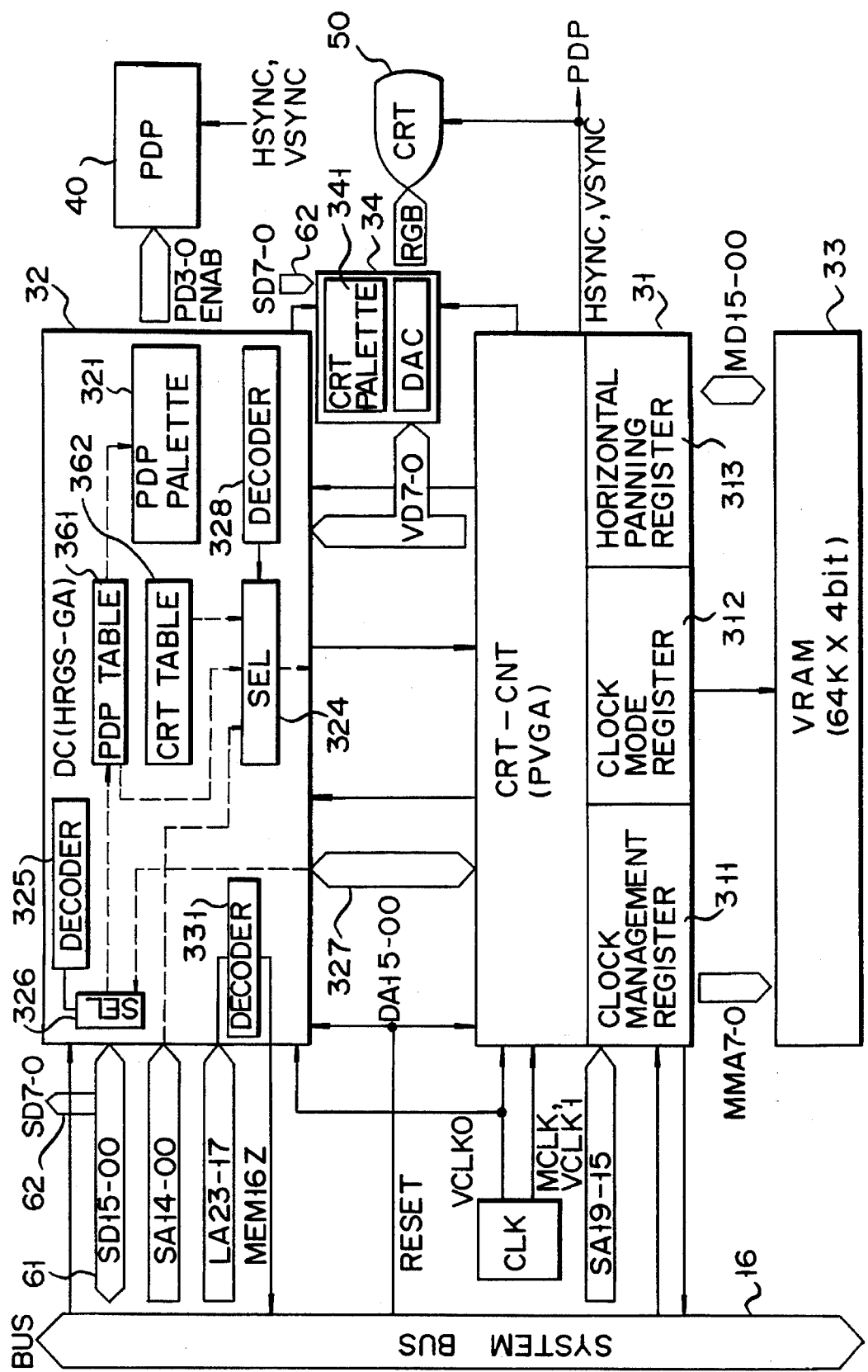
FIG. 12 is a view showing a modification of the embodiment shown in FIG. 2.

The present invention is not limited to the particular embodiment described above. Instead of the display timing data register 322 and the display timing converter 323 of FIG. 2, a CRT table 362 for storing CRT display timing data and a PDP table 361 for storing PDP display timing data are arranged in the display controller 32, as shown in FIG. 12. At the time of system setup, the CRT and PDP display timing data from the BIOS-ROM 20 are stored in corresponding tables under the control of the CPU 11. Thereafter, on the basis of these tables, the palette data may be set in the CRT palette 341 and the PDP palette 321. In this case, when display timing data read access is requested from the CPU 11, the CRT display timing data may be read out from the table and may be transferred to the CPU 11.

What is claimed is:

1. A display control apparatus for outputting a resolution of a flat panel display unit on the basis of a resolution of a CRT display unit in a system which is equipped with the flat panel display unit as a standard I/O device for performing a display at a first horizontal resolution, and which is optionally connected to the CRT display unit for performing a display at a second horizontal resolution, said system being arranged to display data in a plurality of display modes including a CRT display mode for displaying data on only said CRT display unit and a dual display mode for displaying data on both said CRT display unit and said flat panel display unit, the display control apparatus comprising:

display timing data storing means for storing display timing data having the second horizontal resolution designated by an application program;

means for detecting, using the display timing data stored in the display timing data storing means, whether the current display mode of said system is the dual display mode;

display timing data converting and generating means for converting the display timing data having the second horizontal resolution into display timing data having the first horizontal resolution and generating display data corresponding to a text character to be displayed on said CRT display unit of which a dot at a specific horizontal dot position is extracted in accordance with the converted display timing data when said detecting means detects that the current display mode is the dual display mode;

display driving means, responsive to the display timing data converted by said display timing converting and generating means, for driving said flat panel display unit and said CRT display unit and for displaying the display data on at least one of the CRT display unit and the flat panel display unit; and means for reading out the display timing data from said display timing data storing means as current display timing data in response to an external request of the display timing data and for outputting the read-out display timing data.

2. An apparatus according to claim 1, further comprising means for outputting the display timing data from said display timing data storing means in response to an external read request of the display timing data.

3. A display control apparatus for outputting a resolution of a flat panel display unit on the basis of a resolution of a CRT display unit in a system which is equipped with the flat panel display unit as a standard I/O device and which is optionally connected to the CRT display unit having a horizontal resolution different from that of the flat panel display unit, the display control apparatus comprising:

first display timing data storing means for storing display timing data having the horizontal resolution of said CRT display unit;

display timing converting means for converting the display timing data stored in said first display timing data storing means into display timing data having the horizontal resolution of said flat panel display unit when display data is to be displayed on the flat panel display unit with the horizontal resolution of the CRT larger than the horizontal resolution of the flat panel display unit;

second display timing data storing means for storing the converted display timing data converted by the display timing data converting means;

generating means for generating, in accordance with the converted display timing data stored in the second display timing data storing means, the display data corresponding to a text character to be displayed on said CRT display unit of which a dot at a specified horizontal dot position is extracted in accordance with the converted display timing data; and display driving means for driving said CRT display unit and said flat panel display unit using the converted display timing data and for displaying the display data on at least one of the CRT display unit and the flat panel display unit.

4. A display control apparatus for outputting a resolution of a flat panel display unit on the basis of a resolution of a CRT display unit in a system which is equipped with said flat panel display unit for performing a display at a first horizontal resolution and which is optionally connected to said CRT display unit for performing a display at the first horizontal resolution or a second horizontal resolution, said system being arranged to display data on only said CRT display unit in a CRT display mode as a display mode and data on both said flat panel display unit and said CRT display unit in a dual display mode, the display control apparatus comprising:

means for storing externally supplied display timing data for said CRT display unit having the second horizontal resolution;

means for detecting, using the display timing data stored in the storing means, whether the current display mode of said system is the dual display mode;

means for generating, in response to the detection of the dual display mode by the detecting means, display timing data having the first horizontal resolution from the display timing data having the second horizontal resolution and corresponding to a text display character to be displayed on said CRT display unit from which a dot at a specific horizontal dot position of the text display character is extracted; and means for driving said CRT display unit and flat panel display unit using the display timing data of the first horizontal resolution generated by said generating means and for displaying the text display character from which the dot at the specific horizontal dot position has been extracted on the flat panel display unit.

5. A display control apparatus for outputting a resolution of a flat panel display (FPD) unit on the basis of a resolution of a CRT display unit in a system which is equipped with said FPD unit as a standard I/O device for performing a display at a first horizontal resolution and which is optionally connected to said CRT display unit for performing a display at the first horizontal resolution or a second horizontal resolution, said system being arranged to display data on only said CRT display unit in a CRT display mode as a display mode and data on said CRT display unit and said FPD unit in a dual display mode, the display control apparatus comprising:

CRT table means for storing externally supplied display timing data for said CRT display unit having the second horizontal resolution;

FPD table means for storing externally supplied display timing data for said CRT display unit having the second horizontal resolution;

FPD table means for storing externally supplied display timing data for said FPD unit having the first horizontal resolution and corresponding to a text display character to be displayed on said CRT display unit from which a dot at a specific horizontal dot position of the text display character is extracted;

detecting means for detecting, using the display timing data stored in the display timing data stored in the CRT table means, whether the current display mode is the dual display mode; and display driving means for driving said CRT display unit and said FPD unit using the display timing data of the first horizontal resolution stored in said FPD table means in response to the detection of the dual display mode by the detecting means and for displaying the text display character from which the dot at the specific horizontal dot position has been extracted on at least one of the CRT display unit and the flat panel display unit.

6. A display control apparatus in a system having a flat panel display unit, comprising:

means for receiving display timing data for a CRT display unit and for outputting the display timing data for said flat panel display unit, the display timing data for said flat panel display unit corresponding to a text display character to be displayed on said CRT display unit from which a dot at a specific horizontal dot position of the text display character is extracted;

storing means for storing the output display timing data for said flat panel display unit; and means for driving said flat panel display unit on the basis of the output display timing data for said flat panel display unit stored in said storing means and for displaying the text display character from which the dot at the specific horizontal dot position has been extracted on said flat panel display unit.

7. A system which is equipped with a flat panel display unit as a standard I/O device and which can arbitrarily be connected to a CRT display unit, and in which data is displayed on the flat panel display unit and the CRT display unit, simultaneously, said system comprising:

means for receiving display timing data for the CRT display unit and for outputting, in a dual display mode, display timing data for the flat panel display unit and said CRT display unit, the display timing data for said flat panel display unit corresponding to a text display character to be displayed on said CRT display unit from which a dot at a specific horizontal dot position of the text display character is extracted;

detecting means for detecting, using the display timing data received by the receiving means, whether the current display mode is the dual display mode; and means for driving the flat panel display unit in accordance with the output display timing data for the flat panel display unit in response to the detection of the dual display mode by the detecting means and for displaying the text display character from which the dot at the specific horizontal dot position has been extracted on said flat panel display unit.

8. The apparatus according to claim 3 further comprising:

means for reading out the display timing data from said display timing data storing means as current display timing data in response to an external read request for the display timing data and for outputting the readout display timing data.

9. The apparatus according to claim 4, further comprising:

means for outputting a content of said storing means in response to a read request for the externally supplied display timing data.

10. The apparatus according to claim 5, further comprising:

means for outputting, in the CRT display mode, display timing data for said CRT display unit in response to a read request for the display timing data.

11. The apparatus according to claim 6, further comprising:

means for outputting display timing data for said CRT display unit in response to a read request for the display timing data.

12. The apparatus according to claims 7, further comprising:

means for outputting the display timing data for the CRT display unit received by the receiving means in response to a read request for the externally supplied display timing data for said CRT display unit.

* * * * *